March 20, 1934.  E. F. LUNDGREN  1,951,878
VALVE
Filed Jan. 9, 1931  3 Sheets-Sheet 1
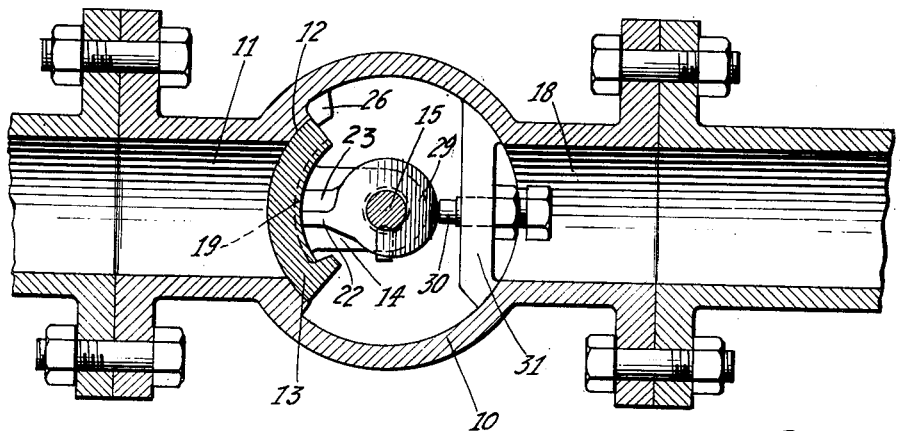
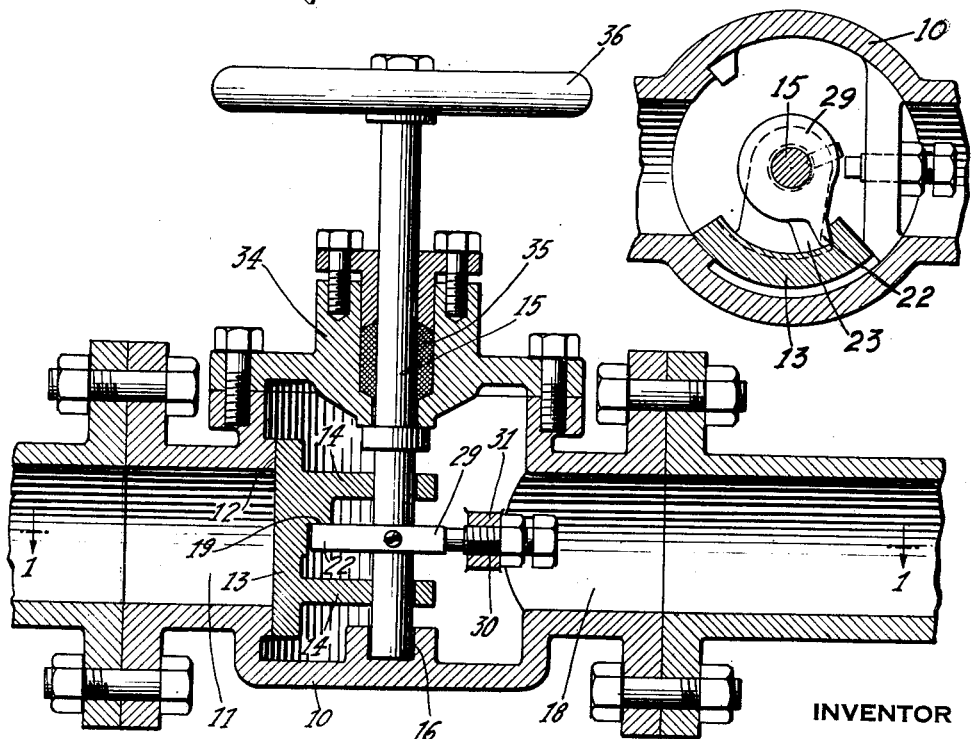
INVENTOR
Ernest F Lundgren
BY his ATTORNEYS

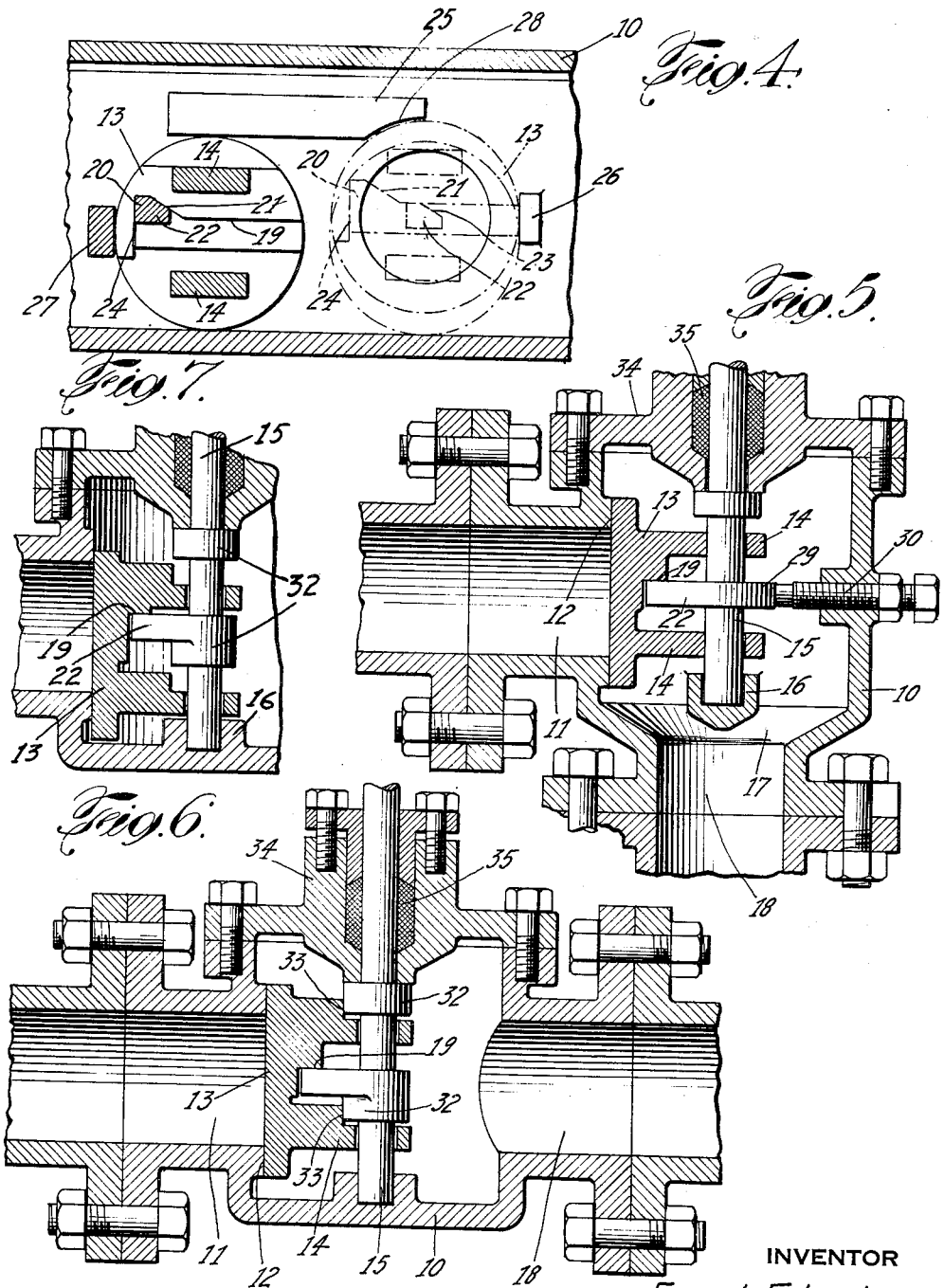

March 20, 1934.　　　E. F. LUNDGREN　　　1,951,878
VALVE
Filed Jan. 9, 1931　　　3 Sheets-Sheet 3

Patented Mar. 20, 1934

1,951,878

UNITED STATES PATENT OFFICE 1,951,878

VALVE

Ernest F. Lundgren, Brooklyn, N. Y.

Application January 9, 1931, Serial No. 507,545

9 Claims. (Cl. 251—102)

This invention relates to valves such, for example, as those employed aboard tankers between the individual tanks to permit separation of such tanks one from another when different grades or types of liquids are carried in the separate units.

This service is typical of many where the present invention is applicable, and where the action of the fluid is such as to cause a relatively large amount of sediment, rust, and other extraneous material to be deposited upon the valve parts, valve seats, etc., so as to hinder the proper operation of the valve and frequently to prevent the complete closing thereof. In the case of valves separating different fluids, it will be apparent that failure of the valve to close permits mixing of fluids and frequently results in considerable damage.

An object of this invention is to provide a valve of such construction and arrangement as to overcome the above conditions and to operate successfully and efficiently for prolonged periods of time under such adverse conditions.

A further object is to provide a valve of the type set forth constructed and arranged to prevent the accumulation of extraneous material on the seating surfaces in such a way as to hinder the proper closing of the valve.

These and other objects which will be apparent to those skilled in this particular art are accomplished by means of the invention illustrated in the accompanying drawings in which, Fig. 1 is a transverse sectional view through a valve constructed in accordance with one embodiment of this invention, and showing the valve in closed position.

Fig. 2 is a similar view showing the valve open.

Fig. 3 is a similar view of the valve shown in Fig. 1 taken at right angles to Fig. 1.

Fig. 4 is a diagrammatic view illustrating the open and closed positions of the valve member.

Fig. 5 is a view similar to Fig. 3 of a modified form.

Fig. 6 is a similar view of a still further modification.

Fig. 7 is a view similar to Fig. 6 showing a different position of the part.

Figure 8:
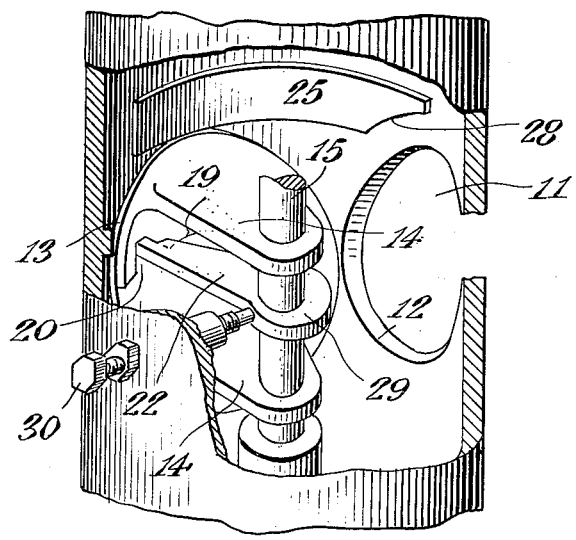
Figs. 8 and 9 are perspective views of the interior of the valve showing the operating parts thereof.

The particular embodiment of this invention which has been chosen for purposes of illustration is more or less of a gate type valve and is provided with a valve disc which is moved to open and closed position by a sliding movement imparted thereto by a suitable operating rod or shaft on which the valve member is loosely mounted and which is provided with a valve engaging arm for moving the valve to open or closed position upon operation of the rod. The closing movement of the valve is limited by a suitable stop. Engagement of the stop by the valve causes a relative movement between the valve and the valve operating arm which produces a sliding of the valve across the valve seat into its final seating position. Certain eccentrics then cause the valve to be pressed against the seat with a tight closing pressure. The sliding movement of the valve proper to and from its seat, and especially the final sliding movement followed by the application of pressure cause the valve to remove any extraneous material which may have collected on the seating surfaces before the valve is pressed against such surfaces so that the latter are kept clean by the operation of the valve itself.

As illustrated, the valve comprises a housing 10 having a port 11 and a valve seat 12 surrounding the inner end of the port. An arcuate valve disc 13 is operatively associated with the valve seat and has a pair of arms 14 having openings through which a valve operating rod 15 loosely extends, the lower end of the rod being positioned in a suitable bearing pocket 16 in the bottom of the housing, the pocket 16 being supported by a spider 17 in the form of valve illustrated in Fig. 5 in which a port 18 is formed in the bottom of the housing instead of at the side thereof as shown in the other views.

Figure 9:
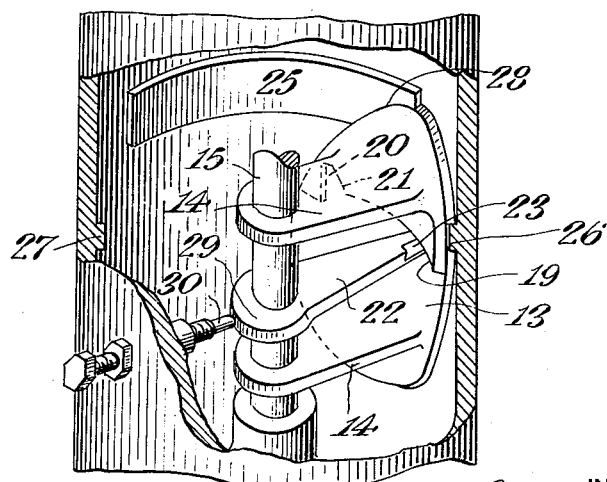

The valve disc 13 is preferably formed by a casting having a ridge 19 formed on the inner face thereof, the ridge being so shaped as to provide a pocket 20 at one end, see Figs. 4, 8 and 9, and inclined surfaces 21 lead from the ridge into the pocket. A valve opening and closing arm 22 is rigidly secured to the rod 15 and the outer end thereof is operatively associated with the ridge 19 and the surface 21, the end of the arm preferably having a beveled or inclined surface 23 for co-operating with the inclined surface 21 adjacent the valve pocket 20. When the end of the arm is positioned in the pocket 20, the lateral face thereof engages the downwardly extending ridge or surface 24. A valve guide 25 is formed on the inner face of the housing for guiding the opening and closing movement of the valve 13, and for causing the inclined surfaces 21 and 23 to operate in the desired manner at the proper time. Closing movement of the valve is limited by a stop 26 and opening movement by a stop 27.

In moving the valve from the open position shown at the left of Fig. 4 and in Fig. 8 to the closed position shown at the right in Figs. 4 and 9, the valve operating rod 15 will be suitably rotated so as to cause the arm 22 to move to the right. The valve engaging end of the arm is located in the pocket 20, see Fig. 8, and the guide 25 holds the valve disc 13 down so that movement of the arm 22 moves the valve toward the stop 26 which is so located as to engage the valve 13 when it is opposite the port 11. Further movement of the valve disc 13 to the right is prevented by the stop 26, so that continued movement of the arm 22 forces the valve end of the arm out of the pocket 20 along the inclined surface 21 into engagement with the ridge 19. Downward movement of the arm 22 being prevented by the rod 15 and supporting pocket 16, this movement of the arm relatively to the valve causes the latter to be raised, such raising movement being permitted by a recess 28 formed in the adjacent portion of the valve guide 25.

Following the final upward closing sliding movement of the valve disc 13 on the seat 12, produced by the movement of the arm 22 out of the pocket 20, closing pressure is applied to the back of the valve so that after such sliding movement it is forced against the valve seat with whatever degree of pressure may be desired. This sliding movement of the valve disc removes from the valve seat any sediment or other particles so that there is no extraneous matter on the seat when the closing pressure is applied to the disc. Hence, the seating surfaces are always clean when pressed together. As illustrated in Figs. 1 to 3, 8 and 9, the valve operating rod 15 is provided with an eccentric or cam 29 which engages a backing screw 30 upon rotation of the rod 15 so that during final closing movement thereof the eccentric engages the backing screw and causes the rod to be shifted toward the valve disc 13 and through the arms 14 to press the disc tighter against the seat 12 with any suitable pressure. Sufficient play of the valve rod 15 in its associated bearings permits the necessary lateral movement of the rod under pressure of the eccentric to press the disc 13 against the seat 12. In the form of valve shown in Figs. 1 and 3, in which the open port 18 is directly opposite the valve controlled port 11, the backing screw is adjustably mounted in a suitable spider 31 or the like. In Fig. 5, in which the open port 18 is in the bottom of the housing, the backing screw is adjustably mounted in the housing itself.

It will be apparent that various arrangements can be provided for causing the rod 15 to apply a closing pressure to the valve disc 13 upon operation of the rod. Another arrangement by which this is accomplished is illustrated in Fig. 6 in which the valve rod 15 has suitable eccentrics 32 co-operating with associated surfaces 33 formed directly on the valve arms 14. In this arrangement, when the valve is moved to closing position into engagement with the stop 26, continued movement of the arm 22 raises the valve so as to slide it across the seat 12 in an upward direction. This movement raises the surfaces 33 into operative association with the eccentrics 32 and simultaneously therewith the eccentrics engage the co-operating surfaces 33 to press the valve closed.

The valve is provided with the usual bonnet 34 having a packing gland 35 through which the operating rod 15 extends and the latter is provided with any suitable operating device such as the hand wheel 36. The operating rod 15 can be of any practical length so as to position the hand wheel 36 some distance away from the valve proper, where this is desirable. It will be apparent that approximately a quarter turn of the rod 15 will be sufficient to completely open or close the valve and that any practicable pressure on the valve disc can be obtained by suitable adjustments of the operating parts.

In opening the valve the rod 15 is moved so as to shift the arm 22 to the left in Fig. 4. The recess 28 in the valve guide 25 holds the valve disc 13 stationary until the arm 22 moves off the ridge 19. As it moves along the inclined surface 21, the disc 13 will slide across the valve face 12 until the arm is positioned in the pocket 20 and engaging the end surface 24, whereupon continued movement of the arm will slide the valve away from the port 11. The sliding movement of the valve across the surface of the valve seat 12 scrapes or cuts any sediment or extraneous material from such surface and the subsequent application of closing pressure after final sliding movement of the valve ensures tight closing thereof.

Although I have described certain specific embodiments of the present invention in more or less detail, it will be apparent that various modifications can be made therein without departing from the spirit of this invention or the scope of the appended claims.

I claim as my invention:—

1. The combination in a valve of a housing having a port therein, a valve disc associated therewith, a rod for operating said disc to open and close said port, means actuated by said rod for sliding said disc across its seat and means for pressing said rod laterally for pressing said disc against its seat.

2. The combination in a valve of a housing having a port therein, a valve, a rod for operating said valve, a valve engaging arm having a cam shaped hub mounted on said rod, the end of said arm engaging co-operating surfaces on said valve, means engaging said cam-shaped hub for moving said rod laterally to press said valve against its seat when closed, and a stop for limiting the movement of said valve in one direction whereby continued movement of said arm relative to said surfaces causes said valve to slide across its seat during final closing movement thereof.

3. The combination in a valve of a housing having a port therein, a valve for opening and closing said port, a valve shifting arm for moving said valve to open or closed position, said arm being movable relatively to said valve, a stop for limiting the closing movement of said valve in one direction so as to cause relative movement between said valve and said arm, and means operated by said relative movement for sliding said valve across said seat.

4. The combination in a valve of a housing having a port therein, a valve for opening and closing said port, a rotatable valve operating rod, a valve shifting arm secured to said rod and engaging said valve to move said valve into open or closed position, a stop for limiting closing movement of said valve in one direction, means operative upon engagement of said stop for sliding said valve across its seat and an eccentric on said rod for simultaneously engaging said valve to press said valve against its seat.

5. The combination in a valve of a housing having a port therein, a valve disc for opening and closing said port, a valve operating rod loosely connected to said valve disc and movable relatively thereto, means on said rod and operated by movement thereof for shifting said valve to open or closed position and means for shifting said rod laterally for pressing said disc against its seat in closed position.

6. The combination in a valve of a housing having a port therein, a valve seat, a valve, a rod for operating said valve, a valve-engaging arm having a cam-shaped hub movable with said rod, the end of said arm engaging co-operating surfaces on said valve whereby operation of said rod causes said valve to slide across said seat to open or close said port, means for guiding the movement of said valve, a stop for limiting closing movement of said valve in one direction whereby continued movement of said arm relative to said surfaces causes said valve to slide across said seat in another direction in opening and closing said valve, said guide being formed to permit such movement.

7. The combination in a valve of a housing having a port therein, a valve seat, a valve, a rod for operating said valve, a valve-engaging arm having a cam-shaped hub movable with said rod, the end of said arm engaging co-operating surfaces on said valve whereby operation of said rod causes said valve to slide across said seat to open or close said port, means for guiding the movement of said valve, a stop for limiting closing movement of said valve in one direction whereby continued movement of said arm relative to said surfaces causes said valve to slide across said seat in another direction in opening and closing said valve, said guide being formed to permit such movement, and a cam on said rod for causing said valve to be pressed against said seat during final movement of said rod.

8. The combination in a valve of a housing having a port therein, a cylindrical valve seat, a valve, a valve operating rod for moving said valve to open and close said port, means operated by said rod to shift said valve laterally across said valve seat in a different direction from the opening and closing movement of said valve and means for pressing said valve against said seat when in closed position.

9. The combination in a valve of a housing having a port therein, a cylindrical valve seat, a valve, a valve operating arm for moving said valve toward and from said port, means co-operating with said arm to shift said valve laterally across said valve seat in a different direction from the opening and closing movement of said valve, and means for pressing said valve against said seat when in closed position.

ERNEST F. LUNDGREN.